United States Patent [19]

Rodgers, Jr.

[11] Patent Number: 5,738,614
[45] Date of Patent: Apr. 14, 1998

[54] STATIONARY EXERCISE APPARATUS WITH RETRACTABLE ARM MEMBERS

[76] Inventor: Robert E. Rodgers, Jr., 8011 Meadowcroft, Houston, Tex. 77063

[21] Appl. No.: 653,333

[22] Filed: May 24, 1996

Related U.S. Application Data

[63] Continuation-in-part of Ser. No. 377,846, Jan. 25, 1995, Pat. No. 5,573,480.

[51] Int. Cl.⁶ ............................. A63B 69/16; A63B 22/04
[52] U.S. Cl. ...................................................... 482/51; 482/57
[58] Field of Search ...................................... 482/51, 52, 53, 482/62, 57

[56] References Cited

U.S. PATENT DOCUMENTS

| | | |
|---|---|---|
| 219,439 | 9/1879 | Blend . |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,923,193 | 5/1990 | Pitzen ........................... 482/62 |
| 4,949,954 | 8/1990 | Hix . |
| 4,949,993 | 8/1990 | Stark et al. . |
| 4,961,569 | 10/1990 | Roberge ....................... 482/62 |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rogers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,336,147 | 8/1994 | Sweeney ....................... 482/62 |
| 5,383,829 | 1/1995 | Miller . |
| 5,401,226 | 3/1995 | Stearns . |
| 5,423,729 | 6/1995 | Eschenbach . |
| 5,441,467 | 8/1995 | Stevens ........................ 482/62 |

FOREIGN PATENT DOCUMENTS 2919-494   5/1979   Germany .

*Primary Examiner*—Stephen R. Crow
*Attorney, Agent, or Firm*—Pravel, Hewitt, Kimball & Krieger

[57] ABSTRACT

A stationary exercising device which promotes cardiovascular exercise yet minimizes impact to critical joints. A base frame supports a pair of reciprocating members which are displaced in a horizontal direction parallel with the floor at one end yet reciprocate in a circular motion at the other end through a coupling system attached to the frame. Structure is included which permits each foot of the user to move in a generally elliptical path during the climbing exercise. This provides for more natural movement of the knee and ankle joints minimizing unnecessary stress on the joints yet permitting a cardiovascular workout. The device includes linkage to facilitate a corresponding upper body exercise involving movement of the arm in which case each hand of the user is displaced along an arc or a substantially elliptical path, again promoting a more natural movement of the ankle, knee, elbow and shoulder joints and permitting a cardiovascular workout. The arm members are retractable.

6 Claims, 4 Drawing Sheets

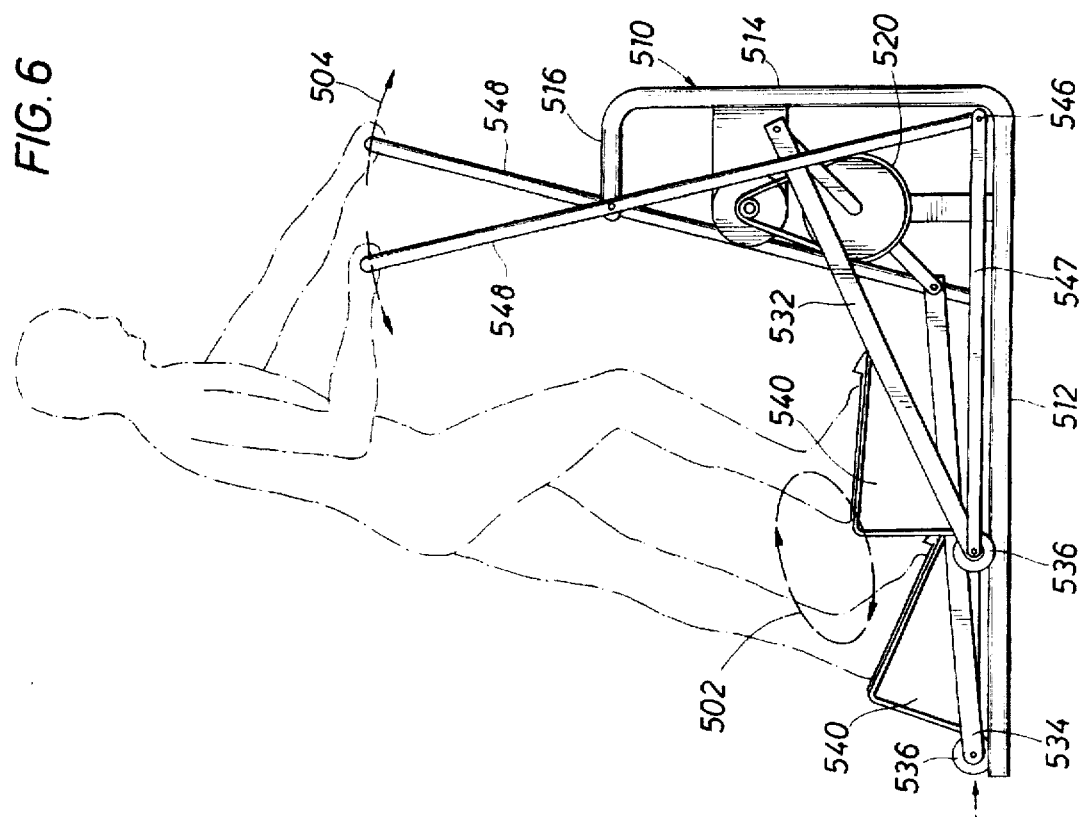
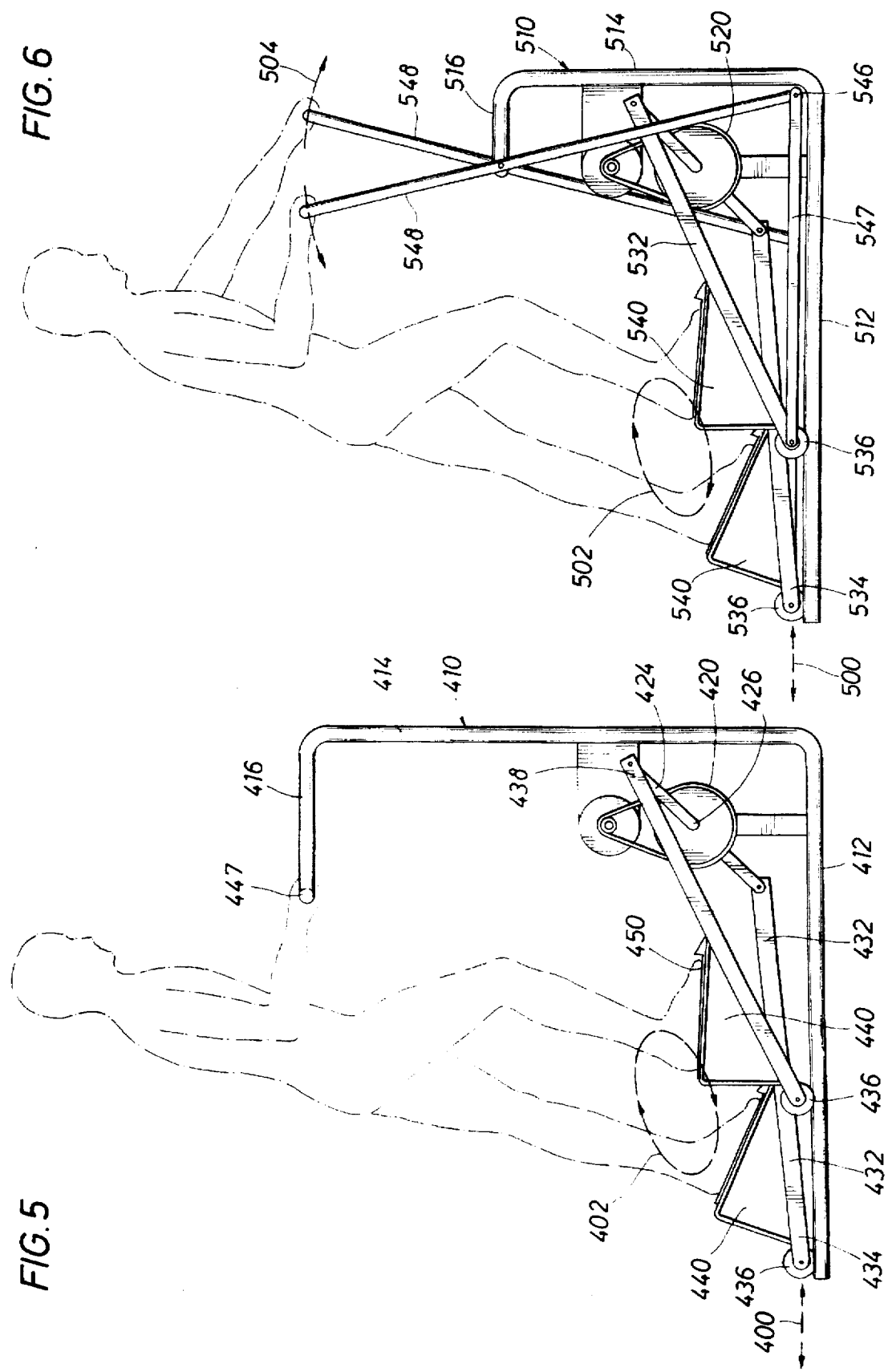

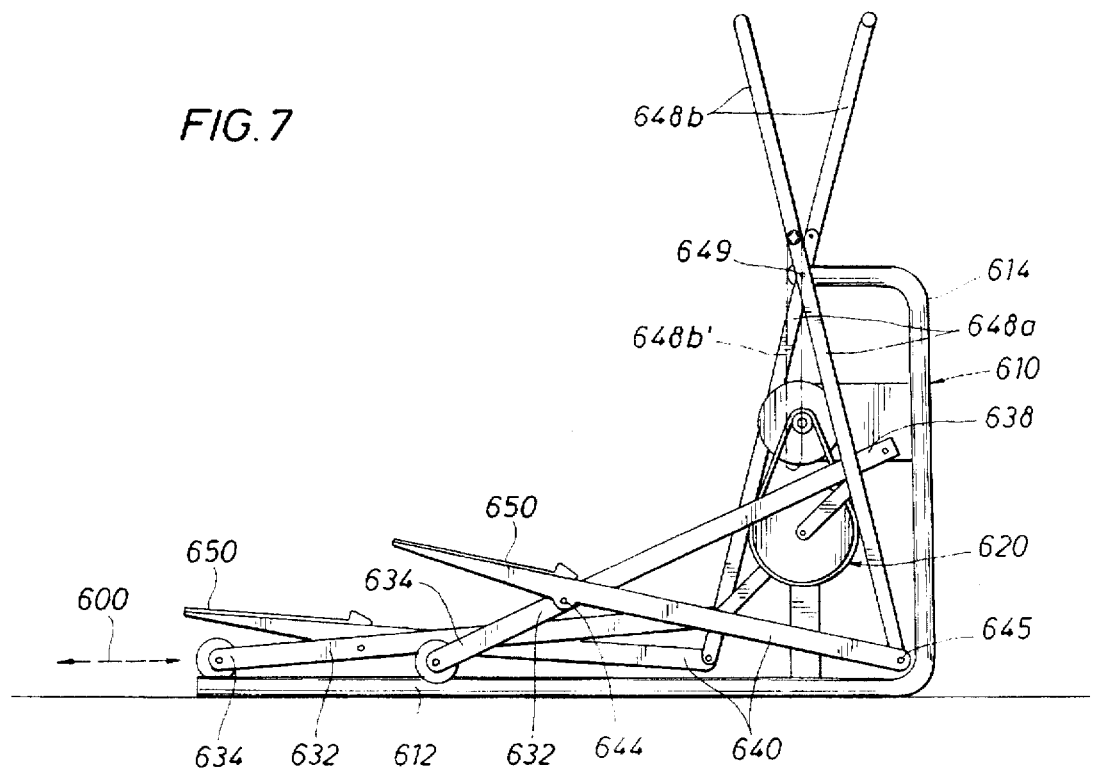
FIG.7
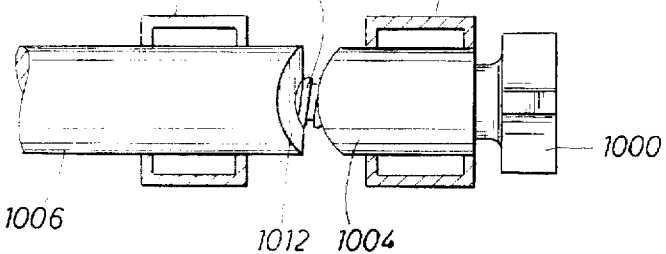
FIG.8A
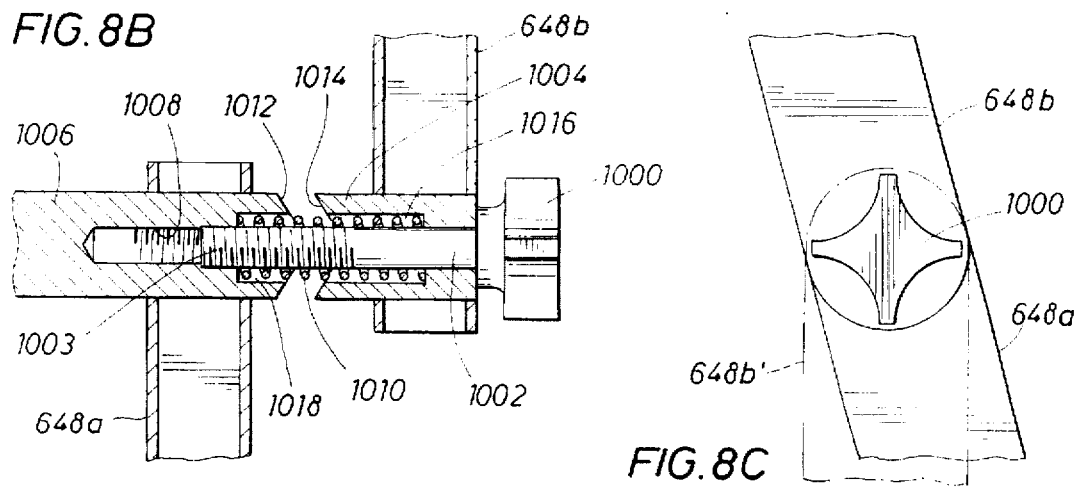
FIG.8B
FIG.8C 5,738,614

STATIONARY EXERCISE APPARATUS WITH RETRACTABLE ARM MEMBERS

RELATED APPLICATION

This patent application is a continuation-in-part of application Ser. No. 08/377,846, entitled STATIONARY EXERCISE APPARATUS and filed Jan. 25, 1995, now U.S. Pat. No. 5,573,480.

BACKGROUND OF THE INVENTION

1. Field of the Invention

The present invention relates to a stationary exercising apparatus. More particular, the invention relates to an improved exercising apparatus having retractable arm members which enables the user to move his feet in an elliptical path more accurately representing the body motion associated with climbing stairs or an inclined ramp.

2. Description of the Prior Art

Stair climbing is a popular form of exercise for the cardiovascular system. However, it can over prolonged use overstress the knees. Walking is also a popular form of exercise but it does not load the cardiovascular system to the extent stair climbing does. Therefore, the need exists for an improved stationary exercising device which will load the cardiovascular system as stair climbing does but does not overload or unduly stress the knees and other joints. Prior art stair climbing devices have two common draw backs. First, they require excessive lifting of the knees or an exaggerated vertical movement of the lower legs. See, for example, U.S. Pat. Nos. 3,316,898; 4,949,993; 4,989,857; and 5,135,477. Alternatively, the devices which do tend to promote a more natural movement of the knees and ankles are difficult to ascend and descend because of the configuration of the devices. See, for example, U.S. Pat. No. 5,242,343.

In addition, the need exists for a more rhythmic movement of the hand motions in combination with a stair climbing exercise to accelerate a cardiovascular workout and exercise the upper body muscle groups without unduly overstressing the elbows and shoulders. Hence, the need exists for an improved stationary exercise device which can combine the movements of the feet and hands in a more natural and rhythmic motion.

SUMMARY OF THE INVENTION

Briefly, the invention relates to an improved stationary exercising device. A frame is provided which includes a base portion adapted to be supported by the floor, a mid portion and a top portion. A coupling member is attached to the frame which includes a pulley defining a pivot axis. Two reciprocating members are positioned in spaced relationship to the base portion of the frame. One end of each reciprocating member is adapted for linear movement substantially parallel with the floor. That end of each of the reciprocating member being linearly displaced may contact the base portion or it may slide directly on the floor. The other end of each reciprocating member is attached, directly or indirectly, to the pulley of the coupling member. In this manner, rotation of the pulley rotates one end of each reciprocating member in a circular motion while the other end of each reciprocating member moves in a linear manner. Means are also included for orienting the bottom of each foot of the user so that each foot follows a substantially elliptical path during the operation of the apparatus.

Such means for orienting the bottom of the foot may include a linkage assembly for each reciprocating member. Each such linkage assembly comprises at least one link which is pivotally connected proximal one end between the two ends of the reciprocating member, closest to the end that is being displaced along the floor. This additional linkage is restrained at its other end within the base portion of the frame permitting the second end of the link only to move substantially parallel with the floor or base as is the case for the first and of each reciprocating member.

In the preferred embodiment, each linkage assembly includes a second link which is pivotally connected to the second end of the first link. The second link is then pivotally restrained to the top portion of the frame proximate its other end. This second link also provides for hand movement.

In another alternate embodiment, each linkage assembly includes a single member which is pivotally supported proximal one end to the reciprocating member closest to the end moving substantially parallel with the floor or base and is vertically restrained proximal its other end to the base portion of the frame.

In yet another alternate embodiment, each linkage assembly includes a single member having a foot contact portion and an elongated portion. One end of the single member is pivotally attached proximal the foot portion to a reciprocating member proximal the first end of the reciprocating member. The single member is then laterally restrained proximal its distal end to the top portion of the frame permitting a substantially elliptical movement of the foot portion with the reciprocating member yet limiting displacement of the upper portion to a rotational or angular movement coupled with the longitudinal movement of the upper portion relative to the frame.

In yet a further alternate embodiment, the means for providing substantially elliptical movement includes a pair of wedge members. One wedge member being attached to each reciprocating member proximal the first end of said reciprocating member being linearly displayed substantially parallel with the floor.

In yet another embodiment of the previous alternate embodiment, a linkage assembly is provided for each reciprocating member comprising two links, a first link being attached at one end to the first end of the reciprocating member being linearly displaced substantially parallel with the floor. The second end of the first link is pivotally attached to the first end of the second link. The second link is pivotally attached proximal to its other end to the top portion of the frame, and the other end of the second link includes a handle portion.

In yet a further alternate embodiment the handle portion of the second link is retractable enabling the user to disconnect the handle portion and pivot it out of the way during use of the present invention.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

FIG. 5 is an elevation view of yet another alternate embodiment of the present invention.

FIG. 6 is an elevation view of yet a further alternate embodiment of the present invention.

FIG. 7 is an elevation view of yet a further alternate embodiment of the present invention as shown in FIGS. 1 or 6.

FIGS. 8a–8c are detailed views of a portion of the alternate embodiment of the present invention shown in FIG. 8.

DETAILED DESCRIPTION OF PRESENT INVENTION

Figure 1:
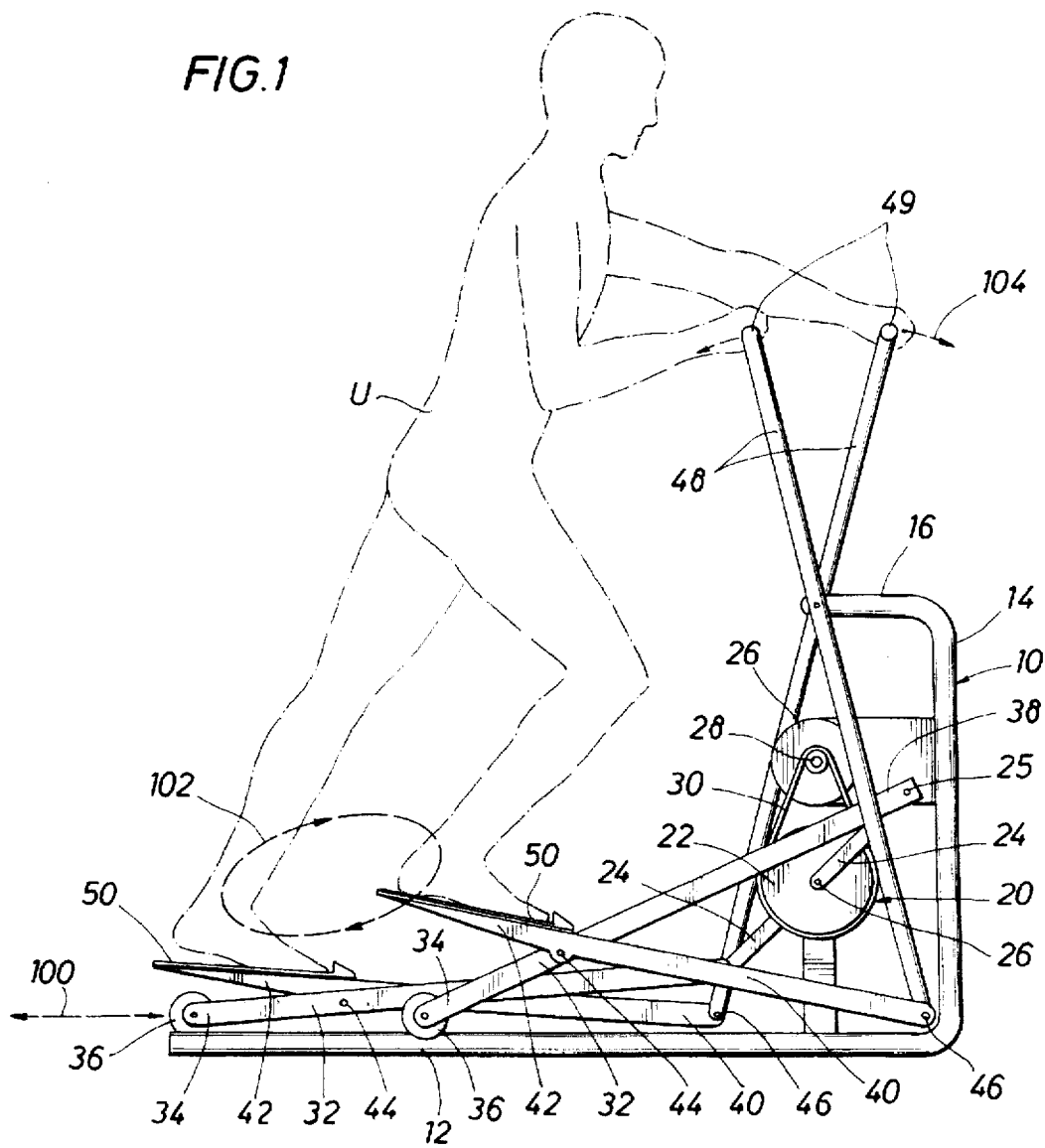
FIG. 1 is an elevation view of the preferred embodiment of the present invention.
Figure 2:
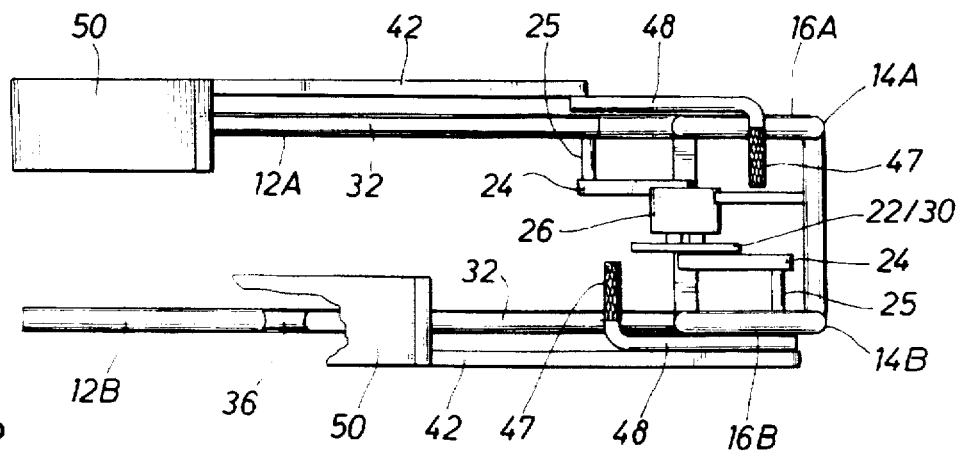
FIG. 2 is a plan view of the preferred embodiment of the present invention.

Referring to FIGS. 1 and 2, a frame 10 is shown comprising a base portion 12, a mid portion 14, and a top portion 16. Referring briefly to FIG. 2, the frame 10 comprises two bottom portions 12a and 12b, two mid portions 14a and 14b, and two top portions 16a and 16b. In essence, the frame is comprised of two separate bents "a" and "b". Obviously, variations can be made to frame 10 as disclosed without departing from the spirit of the invention.

A coupling system 20 is fixed relative to the frame and comprises a pulley 22, crank members 24, resistant brake 23, sheave 28 and belt 30. Two reciprocating members 32 are positioned in the lower proximity of frame 10. Each reciprocating member 32 has one end 34 which is adapted to move laterally in a linear direction as shown in FIG. 1. A roller 36 is mounted at each end 34 of reciprocating member 32 and is adapted, as shown in FIG. 1, to ride on base portion 12 of frame 10. Alternatively, roller 36 may directly engage the floor, if desirable. The other end 38 of each reciprocating member 32 is pivotally connected to one end of a crank 24. The pivotal connection at end 38 may be through a pivotal connection member 25 (see FIG. 2) which extends between the other ends 38 of reciprocating members 32 and cranks 24. The other end of crank 24 is attached to pulley 22 at the pivot axis 26 of the coupling system 20. The pivot axis 26 is the axis about which pulley 22 rotates.

In the preferred embodiment, the present invention also includes two foot members, or contact members, 40. Each foot member 40 is pivotally attached proximate a first end 42 through a pinned connection 44 to the reciprocating arm 32. A foot pad 50 is attached to the top surface of each foot member 40 at its first end 42. Each foot member 40 is pivotally attached at its other end 46 to an arm member 48. Each arm member 48 is also pivotally attached proximal its other end to the top portion 16 of frame 10. A handle portion 47 (see FIG. 2) is included at the top end 49 of each hand member 48. Referring to FIG. 2, it can be easily seen that the frame 10 comprises dual base portions 12A/12B, mid portions 14A/14B and top portions 16A/16B. Furthermore, it can be seen that reciprocating members 32, foot members 40 and arm members 48 provide identical dual systems; each system resting on a base portion 12A or 12B of the frame and each arranged to accommodate one foot and one arm of the user.

In the operation of the preferred embodiment the user "U" can ascend the present invention from the back or the sides which facilitate its use. In some prior art disclosures ascending and descending is difficult and cumbersome due to the location of the pulleys and other structures. See, for example, U.S. Pat. No. 5,242,343. However, in the case of the present invention it is easy to ascend and descend the device as there is a minimal amount of interference in the structure during exercise activity.

During operation, a climbing motion by the user results in the displacement of first ends 34 of each reciprocating member 32 in the direction of arrow 100. Similarly, a circulating motion occurs at the second end 38 of each reciprocating member 32. However at points between the opposite ends 34 and 38 of each reciprocating member 32, the motion gradually changes from a circular motion (at ends 38) to a linear motion the ends 34. This geometric transition occurs in the form of an approximate ellipse. It is not a perfect elliptical shape; and it tends to be slightly more egg-shaped. However, it provides a more natural and rhythmic body movement.

It appears that the preferred location of pinned connection 44 relative to the length of the reciprocating member 32 is in that ⅓ portion closest to the first end 34 of each reciprocating member 32. It is in this range that the movement of each foot of the user follows an elliptical path (as shown by approximate ellipse 102) which is the more natural and comfortable geometric motion of the ankle and knees, minimizing stress on these joints yet permitting continued cardiovascular exercise. During operation, the upper end 49 of each arm member 48 moves in an arc as shown by arrow 104. Such permits hand/arm/shoulder movements for exercising the upper body muscle groups while continuing the cardiovascular exercise.

Resistant brake 26 of coupling system 20 operates in a manner well known to those skilled in the art. Resistant brake 26 serves to increase or decrease the load on the pulley through the sheave 28/belt 30 arrangement. Thus, resistant brake 23 serves to increase or decrease the extent of the cardiovascular workout.

Figure 3:
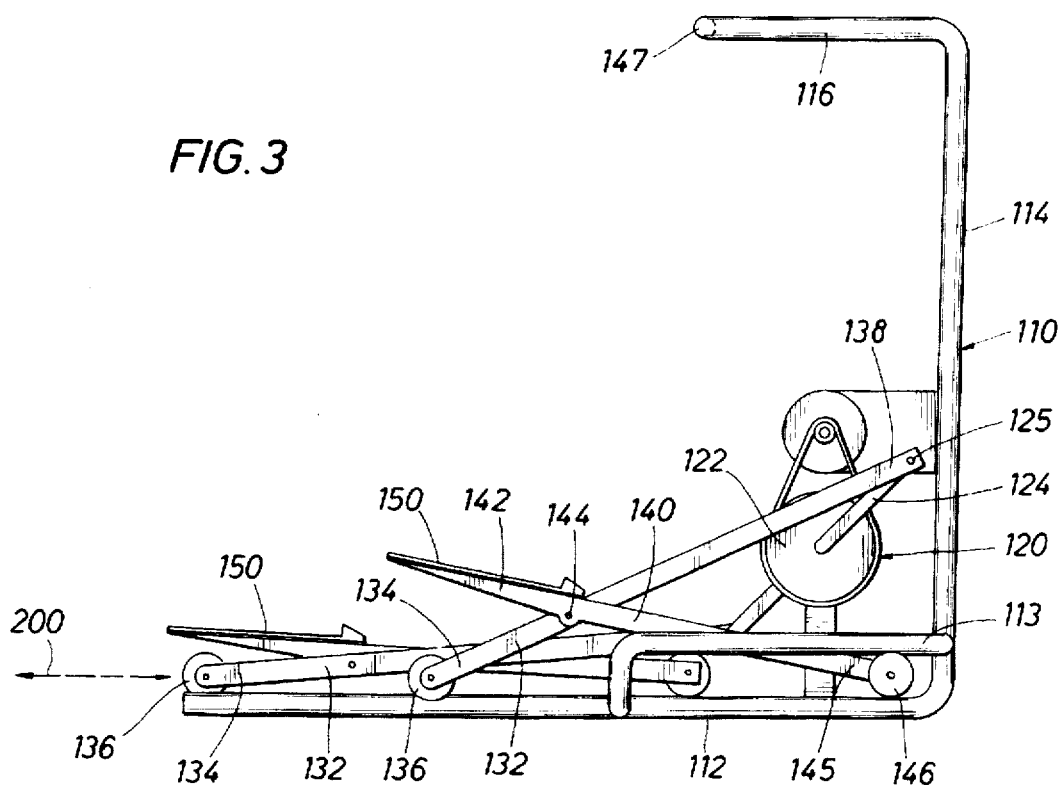
FIG. 3 is an elevation view of an alternate embodiment of the present invention.

Referring now to FIG. 3, an alternate embodiment of the present invention is shown. Identical two-digit reference numerals will be used to designate similar structure found in the preferred embodiment but with a 100 series prefix. Frame 110 comprises a lower portion 116, a mid portion 114, and a top portion 116. A coupling system 120 is included having identical components of the coupling system 20 described above for the preferred embodiment. Furthermore, coupling system 120 performs in an identical manner to coupling system 20 described above for the preferred embodiment.

A pair of reciprocating members 132 are also included, each having a first end 134 on which rollers 136 are mounted. The second end 138 of each reciprocating member 132 is pivotally connected via a pinned connection or pin member 125 to one end of each crank 124. Again, two foot members 140 are included, each being pivotally connected proximate a first end 142 at pinned connection 144 to a corresponding reciprocating member 132. Each foot member 140 also includes a foot pad 150 attached to the top surface of each foot member 140 at first end 142. In this embodiment, however, a roller 146 is attached to each foot member 140 at its second end 145. Each roller 146 engages a top bar 113 of frame 110. Each top bar 113 is connected at one end to mid portion 114 of frame 110 and its other end to base portion 112. In addition, the top portion 116 of each bent of frame 110 is connected by a bar 147 which is adapted to be held by the user during exercising to provide added stability.

In the operation of this alternate embodiment, the user ascends the device from the side or the rear with ease, places both feet on pads 150, grabs bar 147 and begins a stair climbing motion. At that point, first ends 134 of each foot member 140 are displaced in a linear manner in the direction of arrow 200, as in the case of the preferred embodiment. Similarly, as in the case of the preferred embodiment, ends 138 of each reciprocating member 132 move in a circular motion about pulley 122. Again, the change from a linear movement of first ends 134 of reciprocating members 132 and a circular movement of second end 138 of reciprocating member 132 is an approximate ellipse of varying shape. In this alternate embodiment, the second end 145 of each foot member 140 is restrained also to move linearly in the direction of arrow 200. Each roller 146 is restrained from vertical movement by means of bar 113. Thus, in this embodiment, the user does not employ an arm member as shown on the preferred embodiment. Rather, the user grabs the bar 147 for added stability.

Figure 4:
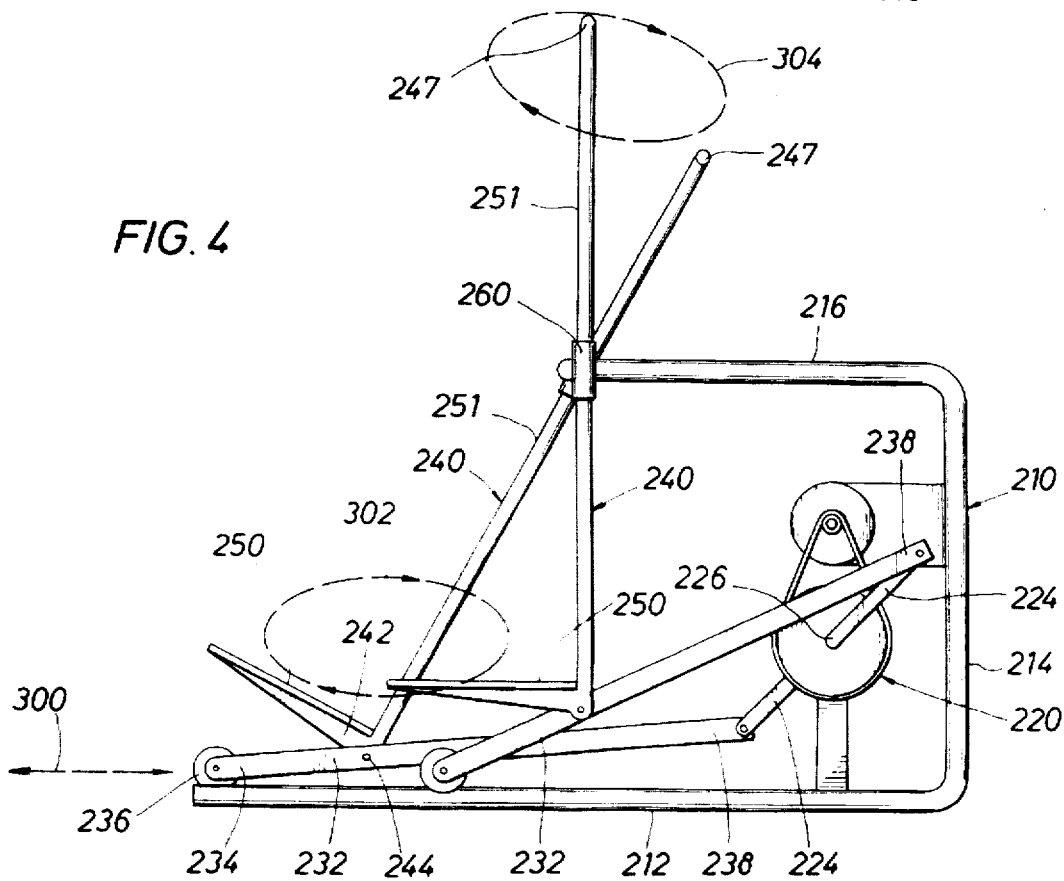
FIG. 4 is an elevation view of another alternate embodiment of the present invention.

Referring now to FIG. 4, another alternate embodiment of the present invention is shown. As before, similar parts will be designated by the same two-digit reference numeral as shown in the preferred embodiment but now with a 200 series prefix. Frame 210 again comprises a base portion 212, a mid portion 214 and a top portion 216. A coupler system 220 is also provided which is identical in structure and function to coupling system 20 of the preferred embodiment (FIGS. 1-2). This alternate embodiment also includes a pair of reciprocating members 232, each having a first end 234 which moves linearly in the direction of arrow 300 by means of rollers 236. As in the case of the previous embodiments, rollers 236 are shown engaging bottom portion 212 of the frame; however, they may slide along the floor rather than the base of the frame. Similarly, each reciprocating member 232 includes a second end 238 pivotally attached to one end of a crank 224. In this alternate embodiment two contact members 240 are included having a foot portion 250 angularly displaced from a longitudinal portion 251. Each contact member 240 is pivotally connected at a first end 242 via pinned connection 244 to a reciprocating member 232. This alternate embodiment also includes a sleeve 260 rotatably mounted to the top portion 216 of frame 210. Each sleeve 260 serves to laterally restrain longitudinal member 251 of contact member 240 permitting only axial (or longitudinal) movement of member 251 relative to sleeve 260 and angular movement of member 251 relative to the top portion 216 of frame 210.

In operation the user ascends the device from the side or the rear and begins the climbing motion using his feet engaging foot portions 250. The upper portion of each longitudinal member 251 includes a handle portion 247 which can be grabbed by the user. As in the case of the previous embodiments, the climbing motion results in a lateral or linear displacement of first ends 234 of each reciprocating member 232 in the direction of arrow 300. However, movement of the user's hands via handle portions 247 is not in an arc as described above with respect to the preferred embodiment or stationary as in the case of the first alternate embodiment. Rather, the path which the hands of the user takes in this alternate embodiment follows a generally elliptical path 304 as do the feet (see approximate elliptical path 302). Thus, this embodiment provides a more extensive cardiovascular exercise in that both upper and lower body motion occurs in a more natural and rhythmic pattern minimizing excessive stress on the ankle, knee, elbow, and shoulder joints.

Referring now to FIGS. 5 and 6, two further embodiments are shown. As in the case of the previous embodiments, similar structure will be referred with the same two-digit reference numeral but with a different prefix. In the case of FIG. 5, the designated structure has a 400 series prefix and in the case of FIG. 6, the designated structure has a 500 series prefix.

Referring to FIG. 5, the frame 410 comprises a bottom portion 412, a mid portion 414 and a top portion 416. A coupler system 420 is shown which includes the same components and functions identically with the coupling system 20 of the preferred embodiment. Two reciprocating members 432 are included, each having a first end 434 to which a roller 436 is attached. The other end 438 of each reciprocating member 432 is pivotally connected to one end of a crank 424 of coupling system 420. The upper portion 416 of frame 410 includes a bar 447 to be grabbed by the user for stability. A wedge or block 440 is attached to the top of each reciprocating member 432 proximate its first end 434. Each block includes a foot pad 450.

As in the case of previous embodiments, the user ascends the device from the side or rear and begins a stair climbing motion by pressing downwardly on each foot pad 450. In this manner the first end 434 of each reciprocating member 432 is linearly displaced in the direction of arrow 400 and end 438 of each reciprocating member 432 is rotated about the pivot axis of 426 of coupling system 420. As in the previous embodiments, such a configuration permits each foot of the user to follow an elliptical path generally shown by approximate ellipse 402.

Referring now to FIG. 6, an alternate embodiment of the version depicted in FIG. 5 is illustrated. Frame 510 comprises base portion 512, mid portion 514 and top portion 516. Once again, a coupling system 520 is shown identical to that in structure and function of coupling system 420 in FIG. 5. Moreover, reciprocating members 532 and wedge members 540 and their interrelationship to coupling system 520 are identical to that depicted by elements 432, 440 and 420, respectively, of FIG. 5.

As in the case of the previous embodiments, operation of the device shown in FIG. 6 results in linear movement of first ends 534 of reciprocating members 532 in the direction of arrow 500. The difference in this alternate embodiment, however, is a pair of linkage assemblies (one for each reciprocating member 532) comprising a first link 547 and a second link 548. One end of link 547 is attached to roller 536 of each reciprocating member 532. First link 547 is pivotally connected at pinned connection 546 to second link 548. Second link 548 is pivotally connected proximate its other end to the top potion 516 of frame 510. The end of second link 548 distal said pinned connection 546 includes a handle portion similar to handle portion 47 of FIG. 2. As in the case of the embodiment shown in FIG. 5, the user of the device shown in FIG. 6 easily ascends the device from the side or the rear, grabs the handle portion and begins to exert downward pressure on the foot pad portions of each wedge or block 540 in a stair climbing motion. As in the previous embodiments, this results in a smooth substantially elliptical motion of each foot of the user as shown by approximate ellipse 502. It also results in the exercising of certain muscle groups in the upper body through rotation of the hands along the arc in the direction of arrow 504.

Referring now to FIG. 7, yet another alternate embodiment of the present invention is shown principally as depicted in FIGS. 1 and 6. As before, similar parts will be designated by the same two-digit reference numeral as shown in the preferred embodiment but now with a 600 series prefix. Frame 610 again comprises a base portion 612, a mid portion 614 and a top portion 616. A coupling system 620 is also provided which is identical in structure and function to coupling system 20 of the preferred embodiment (FIGS. 1-2). This alternate embodiment also includes a pair of reciprocating members 632, each having a first end 634 which is adapted to move laterally in a linear direction. Each reciprocating member 632 also includes a second end 638 pivotally connected to a coupling system 620 as discussed above with respect to the preferred embodiment.

In this alternate embodiment first and second pivot linkage assemblies are also provided; each pivot linkage assembly includes a foot member 640, a foot pad 650 and pivotable arm members 648a and 648b. Each arm member 648a and 648b are pivotally connected to one another at knob 1000 as discussed below. End of arm member 648a is pivotally connected at pin 649 to frame 610. The other end of each arm member 648a is pivotally connected at pin 644 to a foot member 640.

Referring to FIGS. 8a–8c, knob 1000 is connected to a shaft 1002 which is adapted to be inserted within bearing 1004 of arm member 648a and bearing 1006 of arm member 648b. Shaft 1002 includes a threaded portion 1003 adapted to engage corresponding threads 1008 within bearing 1006. A spring 1010 circumscribes shaft 1002 and seats within recess portion 1016 of bearing 1004 and recess portion 1018 of bearing 1006. Additionally, bearing 1004 includes a bevelled surface 1014 adapted to engage and mate with bevelled surface 1012 of bearing 1006. In this manner, the user may rotate knob 1000, rotating shaft 1002 within bearing 1006 thereby compressing spring 1010 which causes the engagement of bevelled surfaces 1012 and 1014. In this manner, top arm member 648b is locked in a vertical position relative to arm member 648a as shown in solid lines in FIGS. 7 and 8c. Alternatively, if the user does not wish to exercise upper body muscles or finds the oscillating movement of upper arm members 648b undesirable, knob 1000 of each arm member 648a/648b may be rotated in a counterclockwise rotation. This causes the separation of bevelled surfaces 1014 and 1012 as a result of the compressive force of spring 1010. Once adequate clearance of bevelled surfaces 1012 and 1014 is achieved, the user may rotate arm member 648b to a vertical position as shown by phantom lines 648b' in FIGS. 7 and 8c.

An improved stationary exercising device is disclosed in the foregoing preferred and alternate embodiments which maximizes cardiovascular exercise yet minimizes stress on critical joints. Obviously, modifications and alternations to the embodiments disclosed herein will be apparent to those skilled in the art in view of this disclosure. However, it is intended that all such variations and modifications fall within the spirit and scope of this invention as claimed.

What is claimed is:

1. An apparatus for exercising comprising:

a frame having a base portion adapted to be supported by a floor;

first and second reciprocating members, each reciprocating member having a first end and a second end, a portion of said first and second reciprocating members adapted for substantially linear motion;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis while a portion of each of said first and second reciprocating members distal said second end of each said first and second reciprocating member moves in a reciprocating pattern;

first and second pivotal linkage assemblies operatively associated with said reciprocating members for orienting the feet of the user of the apparatus so that each foot of the user follows a substantially elliptical path during operation of the apparatus;

said first pivotal linkage assembly being pivotally connected proximate one end between the first and second ends of said first reciprocating member proximate said first end of said first reciprocating member, and said second pivotal linkage assembly being pivotally connected proximate one end between the first and second ends of said second reciprocating member proximate said first end of said second reciprocating member, each linkage assembly being pivotally attached at its other end to said frame distally from said coupling member;

said first and second linkage assemblies having a handle portion proximate said pivotal connection to said frame so that the user of said apparatus may grip the handle portions during use of the apparatus enabling a substantially arcuate movement of said handle portions; and means for disengaging said handle portions.

2. An exercising apparatus comprising:

a frame having a base portion adapted to be supported by a floor;

first and second reciprocating members, each reciprocating member having a first end and a second end;

coupling means for rotating the second ends of said first and second reciprocating members in a substantially circular path about a common axis while a portion of each of said first and second reciprocating members distal said second end of each said first and second reciprocating member moves in a reciprocating pattern;

first linkage assembly having a foot member and an arm member, said foot member of said first linkage assembly pivotally connected to said first reciprocating member proximate said first end of said first reciprocating member, said pivotal connection being proximal a first end of said foot member, and said foot member pivotally connected at its other end to one end of said arm member, said arm member pivotally connected to said frame proximal the other end of said arm member;

second linkage assembly having a foot member and an arm member, said foot member of said second linkage assembly pivotally connected to said second reciprocating member proximate said first end of said second reciprocating member, said pivotal connection being proximal a first end of said foot member of said second linkage assembly, and said foot member of said second linkage assembly pivotally connected at its other end to one end of said arm member of said second linkage assembly, said arm member of said second linkage assembly pivotally connected to said frame proximal to the other end of said arm member of said second linkage assembly; and means for disengaging at least a portion of said arm members eliminating the arcuate path motion, wherein each foot of the user of the device follows a substantially elliptical path and each hand of the user follows a substantially arcuate path.

3. The exercising apparatus according to claim 2 wherein said arm member of said first linkage assembly and said arm member of said second linkage assembly each comprise a first portion and a second portion and said disengaging means comprises means for fixing said first portion to said second portion of each arm member and for releasing said first portion from said second portion of each arm member.

4. The exercising apparatus according to claim 3 wherein said fixing and releasing means further comprises (a) a receptacle member attached to one end of one portion of each arm member, and (b) a threadable member attached to one end of the other portion of each arm member, said threadable member being adapted to engage said receptacle member enabling the fixation of one portion of each arm member relative to the other portion of said arm member or the release of one portion of each arm member relative to the other portion of said arm member.

5. The exercising apparatus according to claim 4 wherein said receptacle member includes a bevelled surface and said threaded member includes a bevelled surface, said bevelled surfaces being adapted to contact one another prohibiting rotational movement of one portion of each arm member relative to the other portion of said arm member.

6. An apparatus for exercising comprising:

a frame having a base portion adapted to be supported by a floor;

a first and second reciprocating members, each reciprocating member having a rear support and a front end;

a coupler supported by said frame defining a pivot axis and having crank members, each said crank member adapted to revolve about the pivot axis at one end and adapted to displace a reciprocating member from the other end of the crank member so that a portion of each reciprocating member proximate said rear support of each reciprocating member moves in a substantially reciprocating motion while the one end of each crank member revolves about the pivot axis;

first and second linkage assemblies, each said linkage assembly pivotally connected at one end to a reciprocating member and pivotally connected proximal the other end of said linkage assembly to said frame, wherein each said linkage assembly includes an arm member having a first portion and a second portion;

a fixation member for engaging and disengaging the first portion of each said arm member with the second portion of said arm member, said fixation member comprising a receptacle member attached to one end of the first portion of each said arm member, and a threadable member attached to one end of the second portion of each arm member, said threadable member being adapted to engage said receptacle member enabling the fixation of the first portion of each arm member relative to the second portion of said arm member or the release of the first portion of said arm member relative to the second portion of said arm member.

* * * * *